United States Patent [19]

Gay

[11] Patent Number: 5,449,505
[45] Date of Patent: Sep. 12, 1995

[54] METHOD FOR DISPOSING OF RADIOACTIVE GRAPHITE AND SILICON CARBIDE IN GRAPHITE FUEL ELEMENTS

[75] Inventor: Richard L. Gay, Chatsworth, Calif.

[73] Assignee: Rockwell International Corporation, Seal Beach, Calif.

[21] Appl. No.: 108,264

[22] Filed: Aug. 19, 1993

[51] Int. Cl.⁶ ............................................. A62D 3/00
[52] U.S. Cl. .................. 423/332; 423/437 R; 588/201; 588/19; 588/1; 976/DIG. 393; 976/DIG. 394
[58] Field of Search ............. 423/5, 437 R, DIG. 12, 423/332; 252/627, 635; 588/201, 1, 19; 976/DIG. 393, DIG. 394; 501/155

[56] References Cited

U.S. PATENT DOCUMENTS

| | | | |
|---|---|---|---|
| 3,322,679 | 5/1967 | Kamemoto et al. | 252/627 |
| 3,483,913 | 12/1969 | Grosvenor et al. | 423/5 |
| 4,145,396 | 3/1979 | Grantham | 588/201 |
| 4,447,262 | 5/1984 | Gay et al. | 423/DIG. 12 |

FOREIGN PATENT DOCUMENTS 3934826  4/1991  Germany ............................ 252/627

Primary Examiner—Gary P. Straub
Assistant Examiner—Stuart L. Hendrickson
Attorney, Agent, or Firm—H. Fredrick Hamann; Harry B. Field; Steven E. Kahm

[57] ABSTRACT

Method for destroying radioactive graphite and silicon carbide in fuel elements containing small spheres of uranium oxide coated with silicon carbide in a graphite matrix, by treating the graphite fuel elements in a molten salt bath in the presence of air, the salt bath comprising molten sodium-based salts such as sodium carbonate and a small amount of sodium sulfate as catalyst, or calcium-based salts such as calcium chloride and a small amount of calcium sulfate as catalyst, while maintaining the salt bath in a temperature range of about 950° to about 1,100° C. As a further feature of the invention, large radioactive graphite fuel elements, e.g. of the above composition, can be processed to oxidize the graphite and silicon carbide, by introducing the fuel element into a reaction vessel having downwardly and inwardly sloping sides, the fuel element being of a size such that it is supported in the vessel at a point above the molten salt bath therein. Air is bubbled through the bath, causing it to expand and wash the bottom of the fuel element to cause reaction and destruction of the fuel element as it gradually disintegrates and falls into the molten bath.

25 Claims, 2 Drawing Sheets

METHOD FOR DISPOSING OF RADIOACTIVE GRAPHITE AND SILICON CARBIDE IN GRAPHITE FUEL ELEMENTS

BACKGROUND OF THE INVENTION

1. Field of the Invention

This invention relates to the destruction of radioactive graphite and silicon carbide in graphite fuel elements, and is particularly directed to a method to destroy the graphite and silicon carbide in radioactive graphite fuel elements containing small spheres of uranium oxide coated with silicon carbide, in a graphite matrix.

2. Description of the Prior Art

Radioactive graphite fuel elements generally contain small spheres of uranium oxide coated with silicon carbide in a graphite matrix. More specifically, the micro spheres consist of an inner core of fissile material or fertile material coated with a layer of graphite, then coated with a layer of silicon carbide to retain the fission products, and finally coated with an outer graphite layer. The fissile material is typically a mixture of uranium oxide, $UO_2$, and uranium carbide, $UC_2$. The fertile material is thorium oxide, $ThO_2$, which is converted to fissile uranium-233 on irradiation with neutrons in a nuclear reactor. A mixture of coated fissile and fertile particles are bonded together into rods with a binder made of graphite powder and pitch. The rods are fired to carbonize the pitch.

In order to reduce the volume of radioactive waste for disposal and to render the radioactive elements into a safe form for long-term storage, a method is needed to destroy effectively the graphite matrix and the silicon carbide coating, while still retaining the radioactive material for subsequent processing. Common incineration processes require very high flame temperatures, near 1200° C., to oxidize graphite, and do not oxidize or destroy silicon carbide. Thus an incinerator must treat this waste in a two-stage process, by first burning off the outer layer graphite and the graphite matrix, and recovering the microspheres in the fly ash and bottom ash. The recovered spheres are then crushed mechanically to break open the SiC and expose the inner layer of graphite. The crushed spheres are recycled into the incinerator to burn the inner layer of graphite. This exposes the radioactive material, fissile, fertile, and fission products, which must then be recovered from the bottom ash and the fly ash.

U.S. Pat. No. 3,567,412, "Gasification of Carbonaceous Fuels", discloses that the presence of sodium sulfate in an alkali metal carbonate melt is effective in promoting the oxidation of carbonaceous materials.

The destruction of the radioactive graphite in radioactive graphite fuel elements is disclosed in U.S. application Ser. No. 108,277 of R. L. Gay and D. Stelman, filed Aug. 19, 1993, titled "Method For Disposing of Radioactive Graphite in Graphite Fuel Elements", and assigned to the same assignee as the present application.

Radioactive graphite fuel elements are approximately 40 cm across the hexagonal diagonal and about 79 cm long. Criticality limits due to fuel enrichment limit the diameter of process vessels to about 20-30 cm ID. This makes processing of whole fuel elements very difficult. Mechanical size reduction of the fuel elements can be done by crushing and grinding the graphite to small particle size, about 1 cm diameter. However, this size reduction process produces many particulate fines, which require stringent containment hardware and procedures. A method is needed for treating these fuel elements without size reduction of the waste.

SUMMARY OF THE INVENTION

It has been found that the graphite in radioactive graphite fuel elements containing spheres of uranium oxide coated with silicon carbide, can be destroyed together with the silicon carbide, by treatment of such radioactive graphite fuel elements in molten sodium-based salt such as molten sodium carbonate, and which can contain a small amount of sodium sulfate as catalyst in the presence of air or oxygen at temperature ranging from about 950° C. to about 1,100° C. Alternatively, the molten salt can be calcium-based salt, and which also can contain a small amount of calcium sulfate as catalyst. The graphite is oxidized to $CO_2$ and the silicon carbide is oxidized to a silicate such as sodium silicate or calcium silicate.

The chemical reactions for oxidation of the graphite and the silicon carbide are carried out in the presence of molten salts. These salts can consist of sodium-based salts, for example, sodium carbonate and sodium sulfate, and which can include sodium chloride or calcium-based salts, for example, a mixture of calcium chloride, calcium oxide and calcium sulfate.

Thus, for example, such graphite fuel elements can be treated in a salt bath of molten alkali carbonate such as sodium carbonate containing sodium sulfate and which also can include NaCl, for rapid oxidation of the graphite to $CO_2$ and for rapid conversion of the silicon carbide coating on the uranium oxide spheres to $CO_2$ and alkali silicate such as sodium silicate, by controlling the process temperature within the narrow temperature range of about 950° C. to about 1,100° C. while retaining the uranium oxide spheres intact in the molten salt bath. Thus, the volume of waste graphite and silicon carbide is decreased while the uranium oxide fuel spheres remain in the salt bath intact for subsequent removal therefrom.

The sodium sulfate in the molten alkali carbonate bath, functions as a catalyst to substantially accelerate the oxidation of the graphite matrix of the graphite fuel elements and the conversion of the silicon carbide coating in the molten salt bath, in the presence of air and while maintaining the reaction temperature within the above noted temperature range. Calcium sulfate performs the same chemical function in the calcium-based salt bath.

Further, in the case of large fuel elements, by use of a specially designed, e.g. conical, reaction vessel for the molten salt, to facilitate gradual slow reaction from the bottom of a large fuel element upwardly in the molten salt bath, the fuel elements will fall gradually by gravity into the salt vessel as the reaction proceeds so that large graphite fuel elements can be processed and destroyed directly in the salt bath without size reduction prior to processing.

OBJECTS OF THE INVENTION

It is accordingly one object of the present invention to provide a process for destroying the graphite matrix and the silicon carbide in radioactive graphite fuel elements containing uranium oxide spheres coated with silicon carbide, in a graphite matrix.

Another object is to provide an improved process of the above type for substantially simultaneously destroying radioactive graphite and silicon carbide in the above noted graphite fuel elements, in a molten alkali metal carbonate or calcium-based salt bath.

Still another object is to provide a system to efficiently react large radioactive fuel elements in a molten salt bath according to the invention.

Other objects and advantages of the invention will be apparent or made obvious by the description below of certain preferred embodiments of the invention.

DETAILED DESCRIPTION OF THE INVENTION AND PREFERRED EMBODIMENTS

The invention is directed to a method for destroying both graphite and silicon carbide in radioactive graphite fuel elements containing small spheres, e.g. microspheres, of uranium oxide coated with silicon carbide in a graphite matrix, which comprises according to one embodiment treating the graphite fuel elements in a salt bath in the presence of air, the salt bath comprising molten alkali carbonate and a small amount of a catalyst in the form of sodium sulfate effective to substantially increase the oxidation rate of graphite, and the oxidation rate of silicon carbide, and maintaining the temperature of the salt bath in a temperature range of about 950° C. to about 1,100° C., preferably about 1,000° to about 1,100° C.

Figure 1:
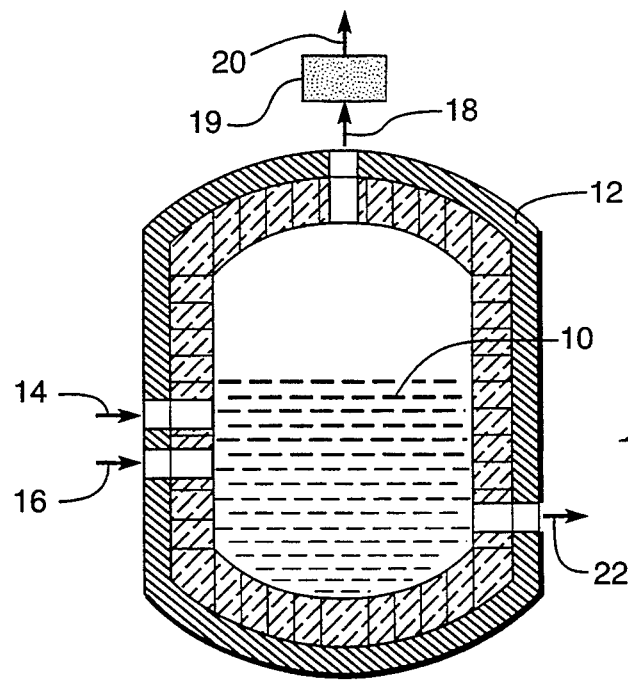
FIG. 1 of the drawing presents a simplified diagram of a molten salt oxidation system which can be employed for carrying out the invention process.

Referring to FIG. 1 of the drawing, there is illustrated a molten salt oxidation system according to the invention, showing a molten sodium carbonate bath at 10 in a furnace 12 of conventional design. The molten sodium carbonate bath contains a small amount of sodium sulfate as catalyst, for destroying the graphite, generally in an amount of about 1 to about 15%, preferably about 5 to about 10%, by weight, based on the total content of the molten sodium carbonate bath. The molten sodium carbonate bath also preferably contains a small amount of about 1 to about 15% NaCl, preferably about 5 to about 10%, by weight based on total bath content.

The feed of the graphite fuel elements is introduced at 14, together with air at 16 into the molten sodium carbonate bath containing the sodium sulfate catalyst, and preferably also sodium chloride. The $CO_2$ gas formed by the oxidation reaction, and $N_2$ is discharged at 18 and passed through a filter 19 and then to stack at 20.

By controlling the process temperature in the range of about 950° C. to about 1,100° C., the graphite matrix is converted to CO or $CO_2$, and the silicon carbide is oxidized and reacted with sodium carbonate. This temperature range is maintained by adjusting the feed rate of the graphite fuel elements and the feed rate of the process air to the molten salt bath. By operating with an excess of air or oxygen, the graphite of the fuel elements is oxidized in the molten salt bath to form $CO_2$ and releasing heat, and the silicon carbide is oxidized to $CO_2$ and $Na_2SiO_3$. When operating in an excess of oxygen stoichiometry, the only stable form of the sulfur of the catalyst will be sodium sulfate. On the other hand if the operation is carried out in a deficiency of air or oxygen, so that incomplete oxidation of the graphite occurs, the CO is formed and under such deficient oxygen conditions, the stable form of sulfur in the molten salt bath will be sodium sulfide. It is preferred to operate so as to result in complete oxidation of the graphite to carbon dioxide so that the catalyst in the sodium carbonate salt bath is sodium sulfate.

The molten sodium carbonate salt containing sodium sulfate, sodium silicate, sodium chloride and the remaining free spheres of uranium oxide, is discharged at 22. The spheres of uranium oxide can be recovered from the molten salt by draining the salt in a molten state from the spheres, by dissolving the salt and recovering the spheres, or by leaving the spheres in a matrix of frozen salt. Recovered molten sodium carbonate salt containing sodium sulfate and sodium chloride can be recycled to the molten bath 10. The sodium silicate is removed from the sodium carbonate and sodium chloride by selective control of the solution temperature such that the sodium silicate is insoluble and can be filtered from the solution.

As previously noted, as an alternative to the use of sodium-based molten salts, calcium-based salts such as calcium chloride, containing calcium oxide and calcium sulfate can be employed, consisting of molten calcium chloride, about 1 to about 15% calcium oxide and about 1 to about 15% calcium sulfate, based on the total weight of the molten salt. The calcium sulfate acts as a catalyst for the graphite oxidation and the silicon carbide oxidation. Preferably, about 5 to about 10% of each of the calcium oxide and calcium sulfate by weight, are employed.

By operating with an excess of air or oxygen, the graphite of the fuel elements is oxidized in the molten salt bath to form $CO_2$ and releasing heat, and the silicon carbide is oxidized to $CO_2$ and $Ca_2SiO_3$. When operating in an excess of oxygen stoichiometry, the only stable form of the sulfur of the catalyst will be calcium sulfate. On the other hand if the operation is carried out in a deficiency of air or oxygen, so that incomplete oxidation of the graphite occurs, CO is formed and under such deficient oxygen conditions, the stable form of sulfur in the molten salt bath will be calcium sulfide. It is preferred to operate so as to result in complete oxidation of the graphite to carbon dioxide so that the catalyst in the sodium carbonate salt bath is calcium sulfate.

The reaction for the oxidation of the graphite in the sodium salt system is:

$$C + O_2 \xrightarrow{Na_2CO_3 + Na_2SO_4} CO_2 \quad (1)$$

and the reactions for the oxidation of silicon carbide are as follows:

$$SiC + 2O_2 \xrightarrow{Na_2CO_3} SiO_2 + CO_2 \quad (2)$$

$$SiO_2 + Na_2CO_3 \longrightarrow Na_2SiO_3 + CO_2 \quad (3)$$

In the calcium salt system the graphite reaction (1) is the same and the silicon carbide reaction (2) is the same. However, the SiO$_2$ reaction is the following:

$$SiO_2 + CaO = CaSiO_3 \qquad (4)$$

In the lower portions of the 950° C. to about 1,100° C. temperature range of operation reaction (1) above occurs for oxidation of the radioactive graphite to CO$_2$, and at the higher temperatures, particularly above 1000° C. of the above noted temperature range reactions (2), (3) and (4) occur, for oxidation of silicon carbide to sodium silicate or calcium silicate, depending on whether sodium carbonate or calcium-based salts are employed as the molten salt.

As an additional feature of the invention, a system has been developed which allows conversion or oxidation of large fuel elements according to the invention without size reduction before treatment. The system can be used for oxidation or reaction of large fuel elements in molten salt baths, for example in sodium-based or calcium-based molten salt baths as described above, and under temperature conditions for oxidation of the graphite and silicon carbide in fuel elements, as described above.

Figure 3:
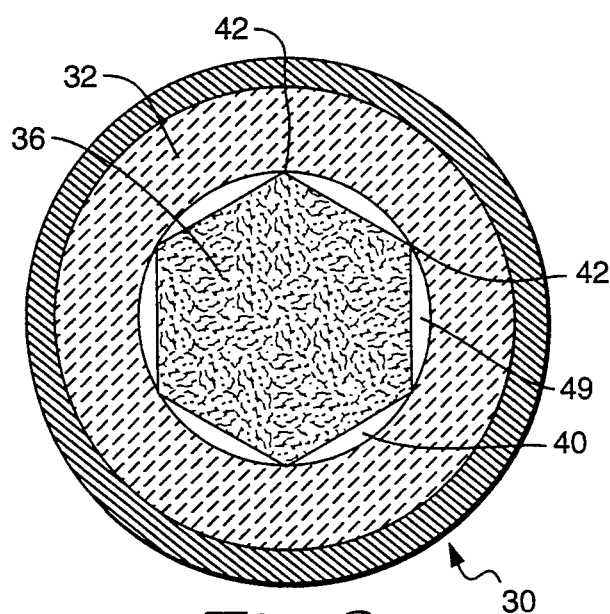
FIG. 3 is a horizontal section taken on line 3—3 of FIG. 2.
Figure 2:
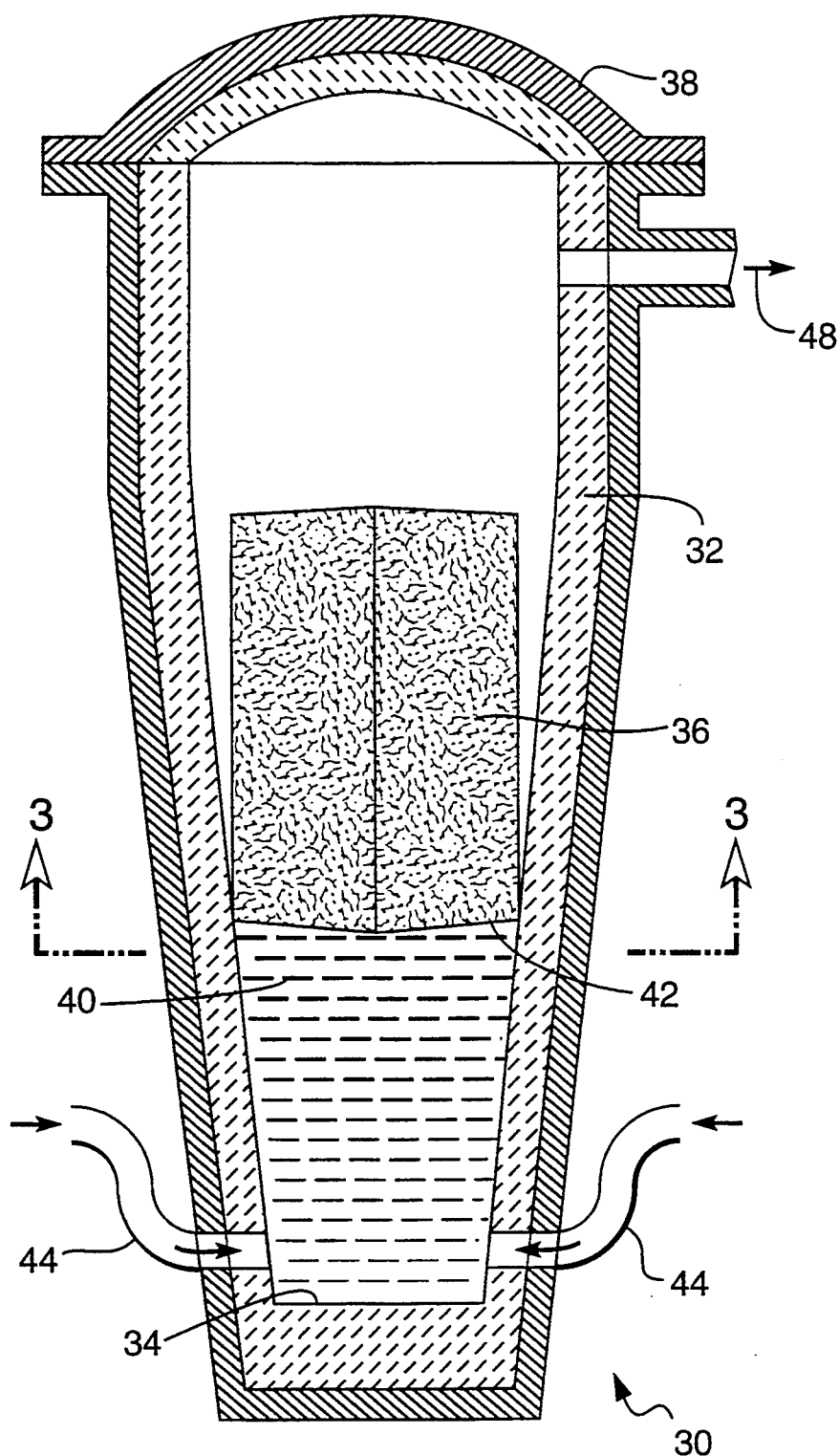
FIG. 2 illustrates a system to facilitate reaction and destruction of large solid radioactive fuel elements in a molten salt bath without size reduction as by crushing prior to processing.

Thus, as illustrated in FIGS. 2 and 3, a molten salt vessel 30 of circular cross-section and conical shape is used, having downwardly and inwardly sloping sides 32 so that the bottom 34 has an internal diameter smaller than that of any cross-sectional area above the bottom of the vessel. A large fuel element 36, e.g. containing a graphite matrix and small spheres of silicon carbide coated uranium oxide, and of polygonal, e.g. hexagonal, cross-section, with a polygonal or hexagonal diagonal greater than that of the internal diameter of the vessel bottom, is introduced into the vessel from the top, after opening the removable top flange 38. A bed of molten salt 40 is maintained in the vessel. It will be noted that the bottom of the fuel element 36 contacts and is supported on the sloping internal wall of the vessel at a point 42 above the body of molten salt 40, thereby restricting downward movement of the fuel element.

After the fuel element 36 is introduced, the vessel is closed at the top and process gas, typically air or oxygen-enriched air, is introduced at 44 into the molten salt, e.g. Na$_2$CO$_3$—NaCl—Na$_2$SO$_4$ as noted above, and is bubbled through the molten salt from the bottom of the vessel. The salt bed will expand to approximately twice its depth, and the salt foam will wash the bottom of the graphite element. The graphite and silicon carbide will react with the oxygen and the salt, and thus consume the fuel element, the CO$_2$ product gas discharged at 48. The fuel element will slowly disintegrate and fall into the molten salt and thus be substantially consumed or destroyed without crushing into small particles. The process is operated as a batch system, with a new fuel element introduced each time.

As shown in FIG. 3, the cross-section of the vessel will allow for passage of the air or oxygen and product gas between the sides of the fuel element and inner wall of the vessel, as indicated at 49, and up the vessel to discharge at 48.

Figure 4:
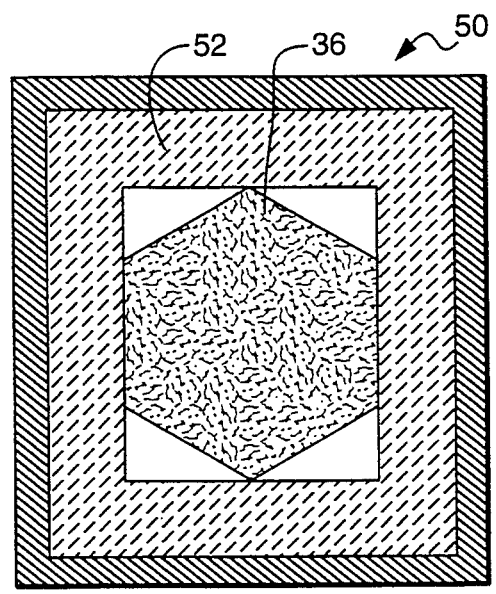
FIG. 4 is an alternative cross section of the vessel design.

As shown in FIG. 4 of the drawing, in place of a reaction vessel having a circular cross-section, the hexagonal fuel element 36 can be disposed in a vessel 50 having downwardly sloping sides as shown in FIG. 2, but of rectangular or square cross-section 52, with the bottom of the fuel element supported above the bottom of the vessel and the salt bed therein, in the same manner as shown in FIG. 2.

It will be understood that this feature of the invention can be employed for graphite fuel elements other than those disclosed herein.

The following are examples of practice of the invention.

EXAMPLE 1

Oxidation of Silicon Carbide and Graphite in Molten Sodium Salts

Waste radioactive fuel elements containing silicon carbide coated microspheres including uranium oxide, embedded in 12 kgs of graphite are reacted with 32 kgs of oxygen (or 138 kgs of air) to produce 44 kgs of carbon dioxide (with 94 kgs of unreacted nitrogen from the air). The fuel elements contain about 0.1 kg SiC which reacts with 0.08 kg oxygen and 0.26 kg sodium carbonate to produce 0.22 kg carbon dioxide and 0.3 kg sodium silicate. The actual amount of oxygen used is about 20% above the required 32 kgs. The sodium silicate is allowed to accumulate in the salt with the fission material (uranium and plutonium), fertile thorium, and fission products. The salt consists of molten sodium carbonate with 10 wt % sodium chloride and 10 wt % sodium sulfate. The sodium sulfate acts as a catalyst for the graphite oxidation and selectively retains the fission products from the microspheres. In addition, the silicon from the silicon carbide selectively ties up the radioactive elements (fissile, fertile and fission products) chemically by forming silicates with them. These silicates are not volatile and thus stay in the salt bath.

The temperature of the molten salt bath is maintained at 960°–1050° C., with a preferred temperature of 1000°–1050° C. The air is introduced separately from the fuel element material, with a small portion of the air used as a conveying gas for the solids. The preferred mode of introducing the radioactive waste is by pretreating the solids in a mill to reduce the size to about 1 cm diameter. Larger chunks may be fed but the reaction rate is reduced.

The process may be operated with either excess air (preferred) or deficient air. When operated with deficient air the graphite is converted to a mixture of carbon monoxide and carbon dioxide. Half the stoichiometric amount is the minimum amount of air that will yield only CO plus N$_2$. The CO may be burned in a secondary combustor downstream of the molten salt vessel. The excess heat is removed by natural cooling of the reactor or by forced cooling on the outside of the vessel. The gas leaving the salt bed is filtered through particulate filters. The molten salt is removed from the vessel by draining it when the accumulated content of uranium, thorium, plutonium, and sodium silicate is about 20 wt %.

EXAMPLE 2

Oxidation of Silicon Carbide and Graphite in Molten Calcium Salts

Waste radioactive fuel elements containing silicon carbide coated microspheres including uranium oxide, embedded in 12 kgs of graphite are reacted with 32 kgs of oxygen (or 138 kgs of air) to produce 44 kgs of carbon dioxide (with 94 kgs of unreacted nitrogen from the air). The fuel elements contain about 0.1 kg SiC which reacts with 0.08 kg oxygen and 0.14 kg calcium oxide to produce 0.11 kg carbon dioxide and 0.29 kg calcium silicate. The actual amount of oxygen used is about 20% above the required 32 kgs. The calcium silicate is allowed to accumulate in the salt with the fission material (uranium and plutonium), fertile thorium, and fission products. The salt consists of molten calcium chloride with 10 wt % calcium oxide and 10 wt % calcium sulfate. The calcium sulfate acts as a catalyst for the graphite oxidation and selectively retains the fission products from the microspheres. In addition, the silicon from the silicon carbide selectively ties up the radioactive elements (fissile, fertile and fission products) chemically by forming silicates with them. These silicates are not volatile and thus stay in the salt bath.

The temperature of the molten salt bath is maintained at 960°–1050° C., with a preferred temperature of 1000°–1050° C. The air is introduced separately from the fuel element material, with a small portion of the air used as a conveying gas for the solids. The preferred mode of introducing the waste is by pretreating the solids in a mill to reduce the size to about 1 cm diameter. Larger chunks may be fed but the reaction rate is reduced.

The process may be operated with either excess air (preferred) or deficient air. When operated with deficient air the graphite is converted to a mixture of carbon monoxide and carbon dioxide. Half the stoichiometric amount is the minimum amount of air that will yield only CO plus $N_2$. The CO may be burned in a secondary combustor downstream of the molten salt vessel. The gas leaving the salt bed is filtered through particulate filters. The molten salt is removed from the vessel by draining it when the accumulated content of uranium, thorium, plutonium and calcium silicate is about 20 wt %.

EXAMPLE 3

Waste radioactive large fuel elements of hexagonal cross-section as illustrated in FIG. 3, containing silicon carbide coated microspheres vary in weight from 30 kg to 120 kg each. On a unit basis of 12 kgs of carbon, the processing of fuel elements consists of the following: 12 kgs of graphite are reacted with 32 kgs of oxygen (or 138 kgs of air) to produce 44 kgs of carbon dioxide (with 94 kgs of unreacted nitrogen from the air). The fuel elements contain about 1.0 kg. SiC which reacts with 0.8 kg oxygen and 2.6 kg sodium carbonate to produce 2.2 kg carbon dioxide and 3.0 kg sodium silicate. The actual amount of oxygen used is about 20% above the required 32 kgs.

A salt bed of sodium-containing salts as in Example 1 is provided in a reaction vessel as shown in FIGS. 2 and 3 and the temperature of the molten bath is maintained at 1000°–1050° C.

The entire fuel element is introduced into the top of the salt vessel and is supported therein above the bottom of the vessel and above the molten salt bed therein. The air is passed from the bottom and expands the salt bed height to sufficiently wash the bottom of the fuel element with salt. The graphite matrix is destroyed by reaction with the salt and the fuel element slowly falls by gravity into the melt bath.

The gas leaving the salt bed is filtered. The silicates formed in the oxidation reaction are not volatile and stay in the molten salt bath, tying up radioactive elements retained in the molten salt bath. The excess heat is removed by natural cooling of the reactor or by forced cooling of the outside of the vessel. The molten salt is removed from the vessel by draining it when the accumulated content of radioactive components is about 20 wt %.

EXAMPLE 4

A waste radioactive large fuel element having the same hexagonal configuration as in Example 3 is introduced into the top of a reaction vessel as seen in FIGS. 2 and 3, containing a calcium-based salt composition substantially the same as in Example 2, the temperature of the salt bath being maintained at 1000°–1050° C. The fuel element is supported in the vessel above the bottom thereof and above the molten salt bath therein.

The air is passed from the bottom and expands the bed height to sufficiently wash the bottom of the fuel element with salt. The graphite matrix is destroyed by reaction with the salt and the fuel element slowly falls by gravity into the melt bath.

The gas leaving the salt bed is filtered. The calcium silicate formed in the oxidation reaction is allowed to accumulate with the radioactive elements in the salt bath. The molten salt is removed from the vessel by draining it when the accumulated content of radioactive components is about 20 wt %.

From the foregoing it is seen that the invention provides an improved accelerated process for the destruction of both radioactive graphite and silicon carbide simultaneously, particularly in fuel elements composed of a graphite matrix containing spheres of uranium oxide coated with silicon carbide, which involves molten salt oxidation of the graphite matrix and the silicon carbide coating with air in molten sodium-based salts, particularly sodium carbonate, containing sodium sulfate catalyst, or calcium-based salts, particularly calcium chloride containing calcium sulfate as catalyst, within a prescribed temperature range, forming carbon dioxide and sodium silicate or calcium silicate, and retaining released radioactive materials in the molten salt bath.

There is also disclosed a novel system for gradually reacting large fuel elements in a molten salt bath noted above in a reaction vessel, whereby the fuel element is supported above the salt bath and the molten salt bath makes contact with and reacts with the bottom of the fuel element first and the oxidation of the graphite fuel element gradually causes the fuel element to drop by gravity as it is reacted, with products of the reaction being discharged as gas or depositing as solids in the molten salt bath.

It is to be understood that what has been described is merely illustrative of the principles of the invention and that numerous arrangements in accordance with this invention may be devised by one skilled in the art without departing from the spirit and scope thereof.

What is claimed is:

1. A method for destroying radioactive graphite and silicon carbide in graphite fuel elements containing small spheres of uranium oxide coated with silicon carbide in a graphite matrix, which comprises treating said graphite fuel elements in a salt bath in the presence of air, said salt bath comprising a molten salt selected from the group consisting of sodium-based salt and calcium-based salt, maintaining the temperature of said salt bath in a temperature range of about 950° C. to about 1100° C., and oxidizing said graphite matrix to $CO_2$ and oxidizing said silicon carbide to a silicate.

2. The method of claim 1, said temperature being in the range of about 1,000° to about 1,100° C.

3. The method of claim 1, employing a sodium-based salt, said sodium-based salt being sodium carbonate, and also including sodium sulfate as catalyst in an amount ranging from about 1 to about 15% by weight based on the total weight of said salt bath.

4. The method of claim 3, said catalyst being present in an amount ranging from about 5 to about 10% by weight based on the total weight of said salt bath.

5. The method of claim 3, and including sodium chloride in said sodium-based salt in an amount ranging from about 1 to about 15% by weight based on the total weight of said bath.

6. The method of claim 4, and including sodium chloride in said sodium-based salt in an amount ranging from about 5 to about 10% by weight based on the total weight of said bath.

7. The method of claim 1, employing a calcium-based salt, said calcium based salt being calcium chloride, and also including calcium sulfate as catalyst in an amount ranging from about 1 to about 15% by weight based on the total weight of said bath.

8. The method of claim 7, said catalyst being present in an amount ranging from about 5 to about 10% by weight based on the total weight of said salt bath.

9. The method of claim 7, and including calcium oxide in said calcium-based salt in an amount ranging from about 1 to about 15% by weight based on the total weight of said bath.

10. The method of claim 7, and including calcium oxide in said calcium-based salt in an amount ranging from about 5 to about 10% by weight based on the total weight of said bath.

11. A method for destroying radioactive graphite and silicon carbide in fuel elements containing small spheres of uranium oxide coated with silicon carbide in a graphite matrix, which comprises introducing said graphite fuel elements into a salt bath consisting essentially of molten sodium carbonate and sodium sulfate as catalyst, in an amount ranging from about 5 to about 10% by weight based on the total weight of said salt bath, introducing air or oxygen into said salt bath, maintaining the temperature of said salt bath in the range of about 1,000° C. to about 1,100° C., and converting said graphite matrix to $CO_2$ and converting said silicon carbide to $CO_2$ and sodium silicate, and retaining said uranium oxide in said bath.

12. The method of claim 11 and including about 5 to about 10% sodium chloride by weight based on the total weight of said salt bath.

13. The method of claim 12, employing about 10% sodium sulfate and about 10% sodium chloride by weight based on the total weight of said bath.

14. A method for destroying radioactive graphite and silicon carbide in fuel elements containing small spheres of uranium oxide coated with silicon carbide in a graphite matrix, which comprises introducing said graphite fuel elements into a salt bath consisting essentially of molten calcium chloride and calcium sulfate as catalyst, in an amount ranging from about 5 to about 10% by weight based on the total weight of said salt bath, introducing air or oxygen into said salt bath, maintaining the temperature of said salt bath in the range of about 1,000° C. to about 1,100° C., and converting said graphite matrix to $CO_2$ and converting said silicon carbide to $CO_2$ and sodium silicate, and retaining said uranium oxide in said bath.

15. The method of claim 14 and including about 5 to about 10% calcium oxide by weight based on the total weight of said salt bath.

16. The method of claim 15, employing about 10% calcium sulfate and about 10% calcium oxide by weight based on the total weight of said bath.

17. A method for treating a radioactive graphite fuel element to oxidize same, which comprises introducing said fuel element downwardly into a reaction vessel containing a molten salt bath, maintaining said fuel element in position above the molten salt bath, introducing air or oxygen into said molten salt bath and causing same to expand into contact with the bottom of said fuel element, causing the oxygen to react with the graphite at the bottom of said fuel element, and causing said fuel element to disintegrate and fall into said molten salt bath as said reaction continues to occur until said fuel element is substantially consumed.

18. The method of claim 17, said reaction vessel having downwardly and inwardly sloping sides and said fuel element having a polygonal cross-section with a polygonal diagonal greater than the internal diameter of said vessel at the bottom thereof, thereby restricting downward movement of said fuel element and causing said fuel element to be supported on the sides of the vessel in a position above the molten salt bath.

19. The method of claim 18, said vessel having an outlet adjacent the upper end for discharge of product gas and an air inlet adjacent the bottom thereof.

20. The method of claim 18, said fuel element having a hexagonal cross-section and a hexagonal diagonal greater than the internal diameter of said vessel at the bottom thereof.

21. The method of claim 18, said reaction vessel having a circular or rectangular cross section.

22. The method of claim 17, said fuel element containing small spheres of uranium oxide coated with silicon carbide in a graphite matrix.

23. The method of claim 22, said molten salt bath comprising a molten salt selected from the group consisting of sodium-based salt and calcium-based salt, maintained in a temperature range of about 950° C. to about 1100° C., and oxidizing said graphite matrix to $CO_2$ and oxidizing said silicon carbide to a silicate.

24. The method of claim 23, employing a sodium-based salt, said sodium-based salt being sodium carbonate, and also including about 1 to about 15% sodium sulfate and about 1 to about 15% sodium chloride, by weight.

25. The method of claim 23, employing a calcium-based salt, said calcium-based salt being calcium chloride, and also including about 1 to about 15% calcium sulfate and about 1 to about 15% calcium oxide, by weight.

* * * * *